(No Model.)
T. GUINEAN.
Filter.
No. 235,764. Patented Dec. 21, 1880.
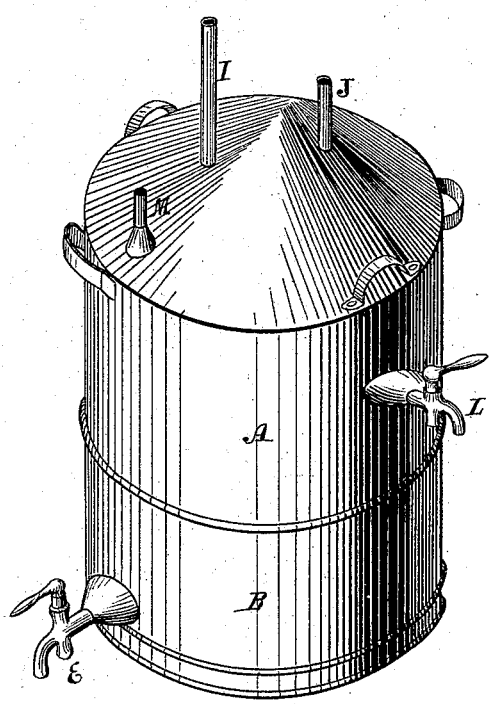
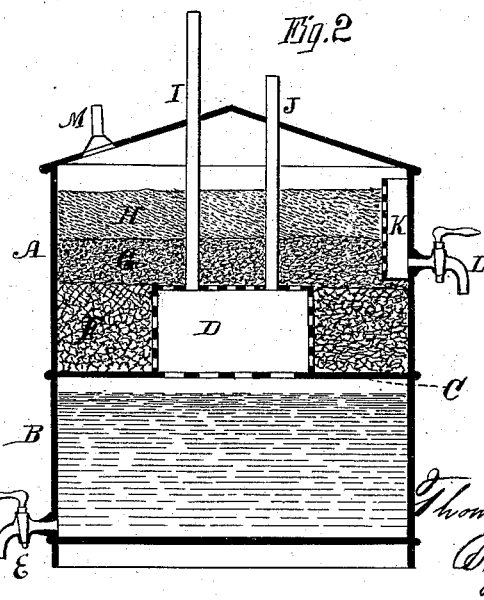
Witnesses
Frank A. Brooks
Geo. H. Strong
Inventor
Thomas Guinean
By Dewey & Co
Attys

UNITED STATES PATENT OFFICE.

THOMAS GUINEAN, OF SACRAMENTO, CALIFORNIA.

FILTER.

SPECIFICATION forming part of Letters Patent No. 235,764, dated December 21, 1880.

Application filed August 9, 1880. (No model.)

*To all whom it may concern:*

Be it known that I, THOMAS GUINEAN, of the city and county of Sacramento, State of California, have invented an Improved Filter; and I hereby declare the following to be a full, clear, and exact description thereof.

My invention relates to an improved filter for cleansing, purifying, and aerating water so as to fit it for culinary, drinking, and other purposes.

It consists of certain details of construction, as fully described hereinafter and specifically claimed.

Referring to the accompanying drawings for a more complete explanation of my invention, Figure 1 is a view of my filter. Fig. 2 is a vertical section.

A is a vessel of any suitable dimensions, and having a capacity from one gallon upward. The lower part, B, of this vessel serves to contain the water after it has been filtered, while the upper portion contains the filtering apparatus.

A partition, C, placed at a suitable distance from the top, supports the filter, which is constructed as follows:

D is a conical or other suitably-shaped chamber, secured to the center of the partition C, and just over the discharge-opening. This chamber is perforated so that the water, after passing through the filtering material, will enter the chamber through the perforations and pass thence to the receiver, from which it may be drawn by a faucet, E.

The chamber D is surrounded by a layer of charcoal, F, carefully prepared and packed, above which is a layer of sand or gravel, G, and above this is a layer, H, of oyster-shells. This layer is prepared by boiling the shells for twenty-four hours, then drying and pulverizing them, after which they are packed solidly upon the sand or gravel.

From the top of the chamber D two air-pipes, I J, extend up to a point above the top of the filter, one being a little longer than the other, so that one supplies air to and the other discharges air from the chamber. In order to clean my filter when necessary, I employ a perforated pipe or chamber, K, which extends down one side of the filter and inside the vessel A, as shown. A faucet, L, connects with this perforated pipe near the bottom.

An air faucet or cock, M, connects with the upper part of the filter to admit air. When the filter is to be cleaned, water is admitted upon the top of the filtering material, and the faucet L being opened, the mud or other impurities will be carried from the top of the filter out through the chamber K and faucet L.

My filter is especially adapted to cleanse, purify, and prepare muddy river and other soft water for drinking. The upper layer, of pulverized oyster-shells, provides a certain amount of limestone, which will impregnate the water as it passes, and the air-pipes will aerate it as it enters the chamber D. The different parts of the vessel and chambers may be made of zinc, galvanized iron, or other suitable material.

When it is desired to filter water under pressure, as from the street-mains or other source, the filtering material is placed in a reverse order to that above described, in a vessel having a chamber, D, below, into which the water is admitted from the supply-cock, and is forced by the pressure up through the material and discharged at the top. The dirt and impurities collect within the chamber below, from which they may be removed at any time.

Having thus described my invention, what I claim as new, and desire to secure by Letters Patent, is—

1. In combination with the tank A and the perforated receptacle D, surrounded by filtering material, the air-pipes I J, substantially as and for the purposes set forth.

2. The combination of the chamber A, provided with filtering material, the pipe M, and the chamber K, provided with perforated wall and faucet L, substantially as described.

In witness whereof I have hereunto set my hand.

THOMAS GUINEAN.

Witnesses:
J. N. PATTON,
BENJ. D. KENNEDY.